Figure 1:
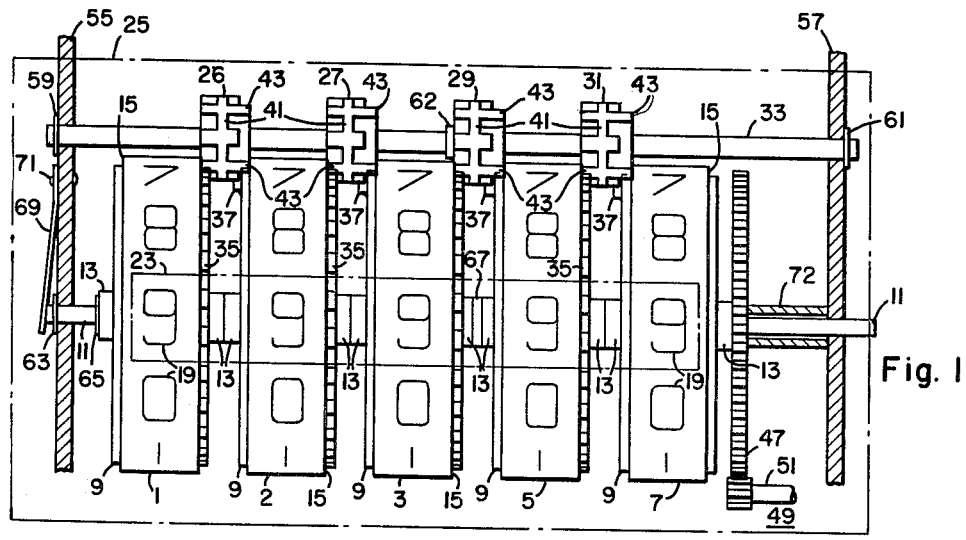

April 13, 1965  E. C. KNECHT ETAL  3,178,110

METER REGISTER

Filed May 16, 1962

WITNESSES

INVENTORS
Eugene C. Knecht &
Merrion D. Gill
BY
ATTORNEY

United States Patent Office 3,178,110
Patented Apr. 13, 1965

3,178,110
METER REGISTER
Eugene C. Knecht and Merrion D. Gill, Raleigh, N.C., assignors to Westinghouse Electric Corporation, Pittsburgh, Pa., a corporation of Pennsylvania
Filed May 16, 1962, Ser. No. 195,252
4 Claims. (Cl. 235—144)

This invention relates to counter devices, and it has particular relation to counter devices in the form of cyclometer registers for integrating meters.

One type of cyclometer register comprises a plurality of indicia-bearing counter wheels or drums mounted on a first shaft for rotation relative to each other and to the shaft about a common axis. A coupling member disposed between and engaging adjacent ones of such counter wheels advances a first of such adjacent wheels by the angular distance between successive indicia thereon for each revolution of the second of such adjacent wheels. Each coupling member may take the form of a pinion mounted on a second shaft for rotation about an axis parallel to the counter wheel axis.

If the lowest-order counter wheel of such a cyclometer register is rotated either forwardly or backwardly a sufficient number of times, all of the drums may be reset to indicate a desired reading, such as zero. Depending upon the reading of the register when resetting is desired, however, such a method of resetting may be unduly tedious and time-consuming. In addition, it often is satisfactory or desirable to reset only a higher-order portion of the drums, while maintaining undisturbed the setting of the remaining or lower-order portion of the drums.

In accordance with the invention, means are provided in a cyclometer register having a plurality of coaxial counter wheels for decoupling a higher-order portion of the counter wheels from the remaining lower-order portion thereof. In a preferred embodiment of the invention, the shaft on which the counter wheels are mounted is movable longitudinally but is biased to a normal operating position. When the shaft is moved in opposition to its bias, the aforementioned higher-order portion of the counter wheels moves in unison therewith to effect the desired decoupling from the remaining lower-order portion of the counter wheels. If the higher-order portion includes more than one counter wheel, each of the coupling members or pinions between adjacent ones thereof also moves along its associated shaft in unison with the counter wheel shaft. As a result, the lowest-order one of the higher-order portion of the counter wheels may be rotated manually to reset each of the higher-order counter wheels. If the cyclometer register is of the decimal type, it will be appreciated that the number of turns necessary to reset all of the decoupled higher-order counter wheels to zero may be expressed by the following equation:

$$n_h = \frac{n_t - r}{10^L}$$

where
$n_h$ = number of turns required to reset only all of the higher-order decoupled portion of the counter wheels;
$n_t$ = number of turns in the same direction required to reset all of the counter wheels in the absence of decoupling;
$r$ = absolute reading of the lower-order portion when resetting of the higher-order portion is initiated;
$L$ = number of counter wheels in the lower-order portion.

Each of the counter wheels of the lower-order portion and each of the coupling members or pinions associated therewith remains in its normal operating position during the resetting of the higher-order portion. The bias provided for the counter wheel shaft effects the automatic return to their respective normal operating positions of all of the components which are moved to effect resetting.

It is, therefore, an object of the invention to provide an improved resetting method and apparatus for a cyclometer register.

It is another object of the invention to provide for a cyclometer register having coaxial counter wheels, means for resetting a higher-order portion of such counter wheels independently of the remaining lower-order portion thereof.

It is also an object of the invention to provide a cyclometer register as set forth in the preceding paragraph, in which the higher order portion of the counter wheels is decoupled from the lower-order portion thereof to permit such resetting.

Figure 2:
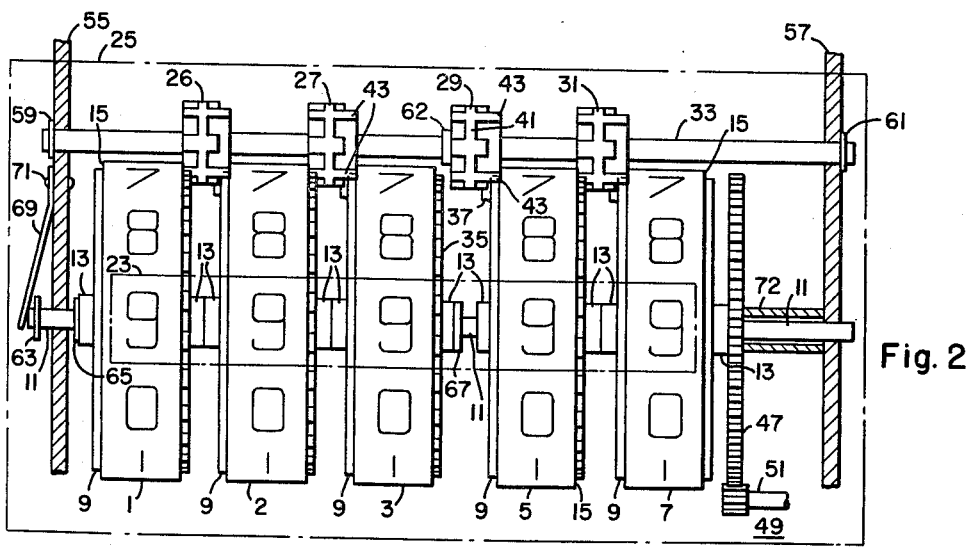

Other objects of the invention will be apparent from the following description taken in conjunction with the accompanying drawing, in which:

FIG. 1 is a view in front elevation with parts broken away and parts not shown of a cyclometer register embodying the invention; and FIG. 2 is a view in front elevation of the cyclometer register of FIG. 1 with a higher-order portion of its counter wheels in resetting position.

Referring to the drawing, FIG. 1 illustrates a cyclometer register having five counter wheels 1, 2, 3, 5 and 7. Each of these wheels includes a disk 9, which is mounted for rotation on a shaft 11. For this purpose, each disk 9 may be provided with a hub 13, which serves to mount the disk rotatably on the shaft 11 and which serves additionally to space the respective counter wheel from adjacent parts of the cyclometer register.

Each of the counter wheels also includes a cylindrical rim 15, which is carried by the disk 9 and which forms therewith a cup or drum structure. The rim may be coated with a layer of material such as white lacquer to form a suitable background for indicia 19 which may be printed thereon. In the specific embodiment illustrated in FIG. 1, the indicia on each of the counter wheels take the form of ten numbers, 0 through 9, which are spaced equally about the cylindrical surface of the counter wheel.

In operation, the right-hand end counter wheel 7 is rotated to move its indicia upwardly, as viewed in FIG. 1. For each full revolution of the counter wheel 7, the counter wheel 5 is actuated in the same direction for an angular distance equal to the spacings between successive numbers thereon. Similarly, the counter wheel 3 is actuated by the distance between successive numbers thereon for each revolution of the counter wheel 5, the counter wheel 2 is actuated by the distance between successive numbers thereon for each revolution of the counter wheel 3, and the left-hand end counter wheel 1 is actuated by the distance between its successive numbers for each revolution of the counter wheel 2. Thus, the counter wheels 1, 2, 3, 5 and 7 may be designated, respectively, "ten-thousands," "thousands," "hundreds," "tens" and "units" counter wheels.

During rotation of the counter wheels, each wheel presents the numbers thereon successively at a viewing point in the form of a window 23 in a faceplate 25, which is illustrated in broken lines. In FIG. 1, the counter wheels are positioned to indicate the quantity of 99,999 through the window 23.

For transmitting motion from one counter wheel to a succeeding counter wheel, a plurality of pinions 26, 27, 29 and 31 are mounted for independent rotation about a shaft 33, which is parallel to the counter wheel shaft 11. The pinion 26 is positioned between the counter wheels 1 and 2 for engaging gear teeth 35 formed on the counter wheel 1 and a pair of spaced adjacent gear teeth 37, only one of which is shown, formed on the counter wheel 2. Similarly, the pinion 27 engages the gear teeth 35 on the counter wheel 2 and the gear teeth 37 on the counter wheel 3, while the pinion 29 engages the gear teeth 35 on the counter wheel 3 and the gear teeth 37 on the counter wheel 5. Finally, the pinion 31 engages similar gear teeth on the counter wheels 5 and 7. The teeth of each of the pinions project from a web 41 having its periphery positioned between the associated pair of counter wheels.

The pinions and gear teeth are so proportioned that for each revolution of one of the counter wheels, such as the counter wheel 7, the two gear teeth 37 on the counter wheel 7 engage the pinion 31 to rotate the counter wheel 5 for a distance equal to the angular spacing between successive numbers on the periphery of the counter wheel 5. In order to prevent movement of the pinions between the periods of engagement of the gear teeth 37 therewith, extensions 43 are formed on alternate teeth of each of these pinions. These extensions 43 project from the main body of the pinion sufficiently to engage the disk 9 of the associated counter wheel. Since two of the extensions normally overlie the disk 9 of the associated counter wheel and are positioned adjacent the surface thereof, such extensions prevent rotation of the pinion. To permit rotation of each pinion when the associated gear teeth 37 are in position to actuate the pinion, a groove (not shown) is positioned in each of the disks 9 to receive one of the extensions 43 of the associated pinion. Consequently, for each revolution of a counter wheel, such as the counter wheel 7, the associated pinion 31 rotates sufficiently to advance the succeeding counter wheel 5 by an angular distance equal to the spacing between successive members on the periphery thereof.

The construction of the cyclometer register thus far specifically described is well known in the art. For further details of such construction, reference may be made to the Barnes Patent 2,365,510.

For actuating the cyclometer register, the hub 13 of the counter wheel 7 may have a driving gear 47 secured thereto so that the counter wheel 7 rotates in unison with the gear 47. The driving gear 47 may be coupled for rotation in accordance with any desired quantity. In the specific embodiment of FIG. 1, the gear 47 is coupled through suitable gearing 49 to a shaft 51 of a watthour meter. Rotation of the driving gear 47 by the shaft of the watthour meter is assumed to be in the same direction as the desired direction of rotation of the counter wheel 7.

The shafts 11 and 33 are inserted through apertures in suitable supporting frame members 55 and 57. The pinion shaft 33 is prevented from moving longitudinally by a pair of fixed washers 59 and 61. The shaft 33 also carries a fixed washer 62.

The counter wheel shaft 11 is prevented from moving longitudinally toward the right, as viewed in FIG. 1, by a washer 63. The shaft 11 also carries a counter wheel positioning washer 65 adjacent the hub 13 of the counter wheel 1 and spaced from the left-hand frame member 55 and a washer 67 between the hub 13 of the counter wheel 3 and the hub 13 of the counter wheel 5. The respective positions of the washers 63, 65 and 67 are fixed relative to the shaft 11. Each of the washers 59, 61, 62, 63, 65 and 67 may be of the split C-type and may be inserted into an annular groove in its associated shaft.

The shaft 11 is biased toward the right, as viewed in FIG. 1, by means of a leaf spring 69, which is secured to the frame member 55 by a rivet 71, and the lower end of which engages the left-hand end of the shaft 11. A tubular counter wheel positioning spacer 72 surrounds the shaft 11 between the driving gear 47 and the right-hand frame member 57.

Referring now to FIG. 2, for resetting purposes the counter wheel shaft 11 is pushed toward the left against the biasing force provided by the leaf spring 69. As a result, the counter wheel shaft washer 67 forces the counter wheels 1, 2 and 3 and the counter wheels 2 and 3, in turn, force the pinions 26 and 27 to move in the same direction along with the shaft 11, while the pinion shaft washer 62 prevents movement of the pinions 29 and 31 and of the counter wheels 5 and 7, maintaining the latter pinions and counter wheels in their respective normal operating positions.

The counter wheel shaft 11 is moved through a distance sufficient to disengage or decouple the gear teeth 35 of the counter wheel 3 from the pinion 29. At this time, each of the higher-order portion of the counter wheels comprising the counter wheels 1, 2 and 3 may be reset to any desired reading, such as zero, by manually rotating the counter wheel 3. It will be noted that such resetting is accomplished independently of the remaining lower-order counter wheels 5 and 7 and their associated pinions 29 and 31.

After the desired resetting is accomplished, the counter wheel shaft 11 is released, and the leaf spring 69 and the washer 65 effect the return of the counter wheels 1, 2 and 3 and the pinions 26 and 27 to their respective normal operating positions, as illustrated in FIG. 1, whereby the gear teeth 35 of the counter wheel 3 reengage the pinion 29. It will be observed that since each of the pinions 26, 27, 29 and 31 maintains its respective normal operating position relative to its associated disk 9 throughout the resetting process, locking of any pinion and its associated disk is prevented upon release of the shaft 11. It will be noted further that during the resetting procedure the driving gear 47 remains engaged with the gearing 49.

Notwithstanding that the pinion shaft washer 62 and the counter wheel shaft washer 67 are positioned in FIGS. 1 and 2 so that the counter wheels 1, 2 and 3 may be reset as described, it will be apparent that these washers may be positioned to effect the resetting of any desired number of the counter wheels in a like manner.

Although the invention has been described with reference to certain specific embodiments thereof, numerous modifications falling within the spirit and scope of the invention are possible.

We claim as our invention:

1. In a counter device, a plurality of counter wheels including first and second adjacent counter wheels, a shaft mounting said counter wheels for rotation relative to each other and for free rotation relative to said shaft about a common axis, each of said counter wheels bearing indicia angularly spaced about said axis for successive presentation at a viewing point as each of said counter wheels rotates, coupling means engaging said first and second counter wheels for advancing said second counter wheel by the angular distance between successive indicia thereon for each revolution of said first counter wheel, driving means operable for rotation relative to said shaft and coupled to said first counter wheel for revolving said first counter wheel relative to said shaft, means mounting said shaft for longitudinal movement, means for moving in unison said shaft and said second counter wheel to move said second counter wheel out of engagement with said coupling means when said shaft is moved longitudinally in the direction of displacement of said second counter wheel from said first counter wheel, and means retaining said driving means and said first counter wheel in predetermined operating positions relative to each other along said common axis during said longitudinal movement of the shaft, said disengagement permitting said second counter wheel to be rotated manually relative to said shaft to reset said second counter wheel independently of said first counter wheel.

2. In a counter device, a plurality of counter wheels including a pair of end counter wheels and at least one counter wheel intermediate said end counter wheels, a shaft mounting said counter wheels for rotation relative to each other and for free rotation relative to said shaft about a common axis, each of said counter wheels bearing indicia angularly spaced about said axis for successive presentation at a viewing point as each of said counter wheels rotates, coupling means disposed between and engaging adjacent ones of said counter wheels for advancing a first of said adjacent counter wheels by the angular distance between successive indicia thereon for each revolution of the second of said adjacent counter wheels, driving means operable for rotation relative to said shaft and coupled to a first of said end counter wheels for revolving said first end counter wheel relative to said shaft, means mounting said shaft for longitudinal movement, means for transmitting a force applied longitudinally of said shaft in the direction of displacement of the second of said end counter wheels from said first end counter wheel to a first intermediate one of said counter wheels and thence to said second end counter wheel only through portions of said counter wheels and said coupling means for moving in unison with said shaft a predetermined portion of said counter wheels including said first intermediate and said second end counter wheels, and the coupling means therebetween to disengage said first intermediate counter wheel from the coupling means between the last-named counter wheel and a counter wheel adjacent thereto, whereby all of the counter wheels in said predetermined portion and the coupling means therebetween are maintained in their respective relative operating positions, and means retaining said driving means, the remaining portion of said counter wheels including said first end counter wheel and the coupling means associated with said remaining portion in their respective operating positions when said shaft is so moved, said disengagement permitting said first intermediate counter wheel to be rotated manually relative to said shaft to reset through the associated coupling means said predetermined portion of said counter wheels independently of said remaining portion thereof.

3. In a watthour measuring mechanism, a counter device comprising a plurality of counter wheels including a pair of end counter wheels and at least one counter wheel intermediate said end counter wheels, a first shaft mounting said counter wheels for rotation relative to each other and for free rotation relative to said first shaft about a common axis, each of said counter wheels bearing indicia angularly spaced about said axis for successive presentation at a viewing point as each of said counter wheels rotates, coupling means comprising a pinion disposed between and engaging adjacent ones of said counter wheels for advancing a first of said adjacent counter wheels by the angular distance between successive indicia thereon for each revolution of the second of said adjacent counter wheels, a drive shaft rotatable relative to said first shaft in accordance with the output of a watthour meter and coupled to a first of said end counter wheels for revolving said first end counter wheel relative to said first shaft, a second shaft mounting said pinions for rotation relative to each other and to said second shaft about a second common axis parallel to said first axis, locking means effective for preventing each of said pinions from rotating independently of its associated one of said second adjacent counter wheels, means mounting said first shaft for longitudinal movement, first means for transmitting a force applied longitudinally of said first shaft in the direction of displacement of the second of said end counter wheels from said first end counter wheel to a first intermediate one of said counter wheels and thence to said second end counter wheel only through portions of said counter wheels and said coupling means for moving in unison with said first shaft a predetermined portion of said counter wheels including said first intermediate and said second end counter wheels and each pinion therebetween to disengage said first intermediate counter wheel from the pinion between the last-named counter wheel and a counter wheel adjacent thereto, whereby all of the counter wheels in said predetermined portion and each pinion therebetween are maintained in their respective relative operating positions, and second means retaining the remaining portion of said counter wheels including said first end counter wheel and each of the pinions associated with said remaining portion in their respective operating positions and for maintaining said drive shaft coupled to said first end counter wheel when said first shaft is so moved, said first and second means maintaining effective said locking means when said first shaft is so moved, said disengagement permitting said first intermediate counter wheel to be rotated manually relative to said first shaft to reset through the associated coupling means said predetermined portion of said counter wheels independently of said remaining portion thereof.

4. In a watthour measuring mechanism, a counter device comprising a plurality of counter wheels including a pair of end counter wheels and at least one counter wheel intermediate said end counter wheels, a first shaft mounting said counter wheels for rotation relative to each other and for free rotation relative to said first shaft about a common axis, each of said counter wheels bearing indicia angularly spaced about said axis for successive presentation at a viewing point as each of said counter wheels rotates, coupling means comprising a pinion disposed between and engaging adjacent ones of said counter wheels for advancing a first of said adjacent counter wheels by the angular distance between successive indicia thereon for each revolution of the second of said adjacent counter wheels, a drive shaft rotatable relative to said first shaft in accordance with the output of a watthour meter and coupled to a first of said end counter wheels for revolving said first end counter wheel relative to said first shaft, a second shaft mounting said pinions for rotation relative to each other and to said second shaft about a second common axis parallel to said first axis, locking means effective for preventing each of said pinions from rotating independently of its associated one of said second adjacent counter wheels, means mounting said first shaft for longitudinal movement, biasing means maintaining said first shaft in a predetermined position, first means secured to and movable with said first shaft relative to said first end counter wheel and engaging a first intermediate one of said counter wheels for transmitting a force applied longitudinally of said first shaft in the direction of displacement of the second of said end counter wheels from said first end counter wheel to said first intermediate counter wheel and thence to said second end counter wheel only through portions of said counter wheels and said coupling means for moving in unison with said first shaft a predetermined portion of said counter wheels including said first intermediate and said second end counter wheels and each pinion therebetween to disengage said first intermediate counter wheel from a first pinion between the last-named counter wheel and a counter wheel adjacent thereto, whereby all of the counter wheels in said predetermined portion and each pinion therebetween are maintained in their respective relative operating positions, second means secured to said second shaft and engaging said first pinion for retaining the remaining portion of said counter wheels including said first end counter wheel and each of the pinions associated with said remaining portion in their respective operating positions and for maintaining said drive shaft coupled to said first end counter wheel when said first shaft is so moved, said first and second means maintaining effective said locking means when said first shaft is so moved, said disengagement permitting said first intermediate counter wheel to be rotated manually relative to said first shaft to reset through the associated coupling means said predetermined portion of said counter wheels independently of said remaining portion thereof, and means movable with said first shaft and engaging said second end counter wheel for movement in unison by said biasing means of said first shaft, said predetermined portion of said counter wheels, and each pinion therebetween to reengage said first intermediate counter wheel with said first pinion when said force is removed from first shaft.

References Cited by the Examiner
UNITED STATES PATENTS

| | | | |
|---|---|---|---|
| 1,091,771 | 3/14 | Schurmann | 235—144 |
| 1,600,319 | 9/26 | Cox | 235—144 |
| 2,269,043 | 1/42 | Spaunburg | 235—132 |

ROBERT L. EVANS, *Primary Examiner.*

LEO SMILOW, *Examiner.*